Aug. 11, 1925.
J. A. ALVEY
CONVEYER
Filed Jan. 29, 1923
1,548,926
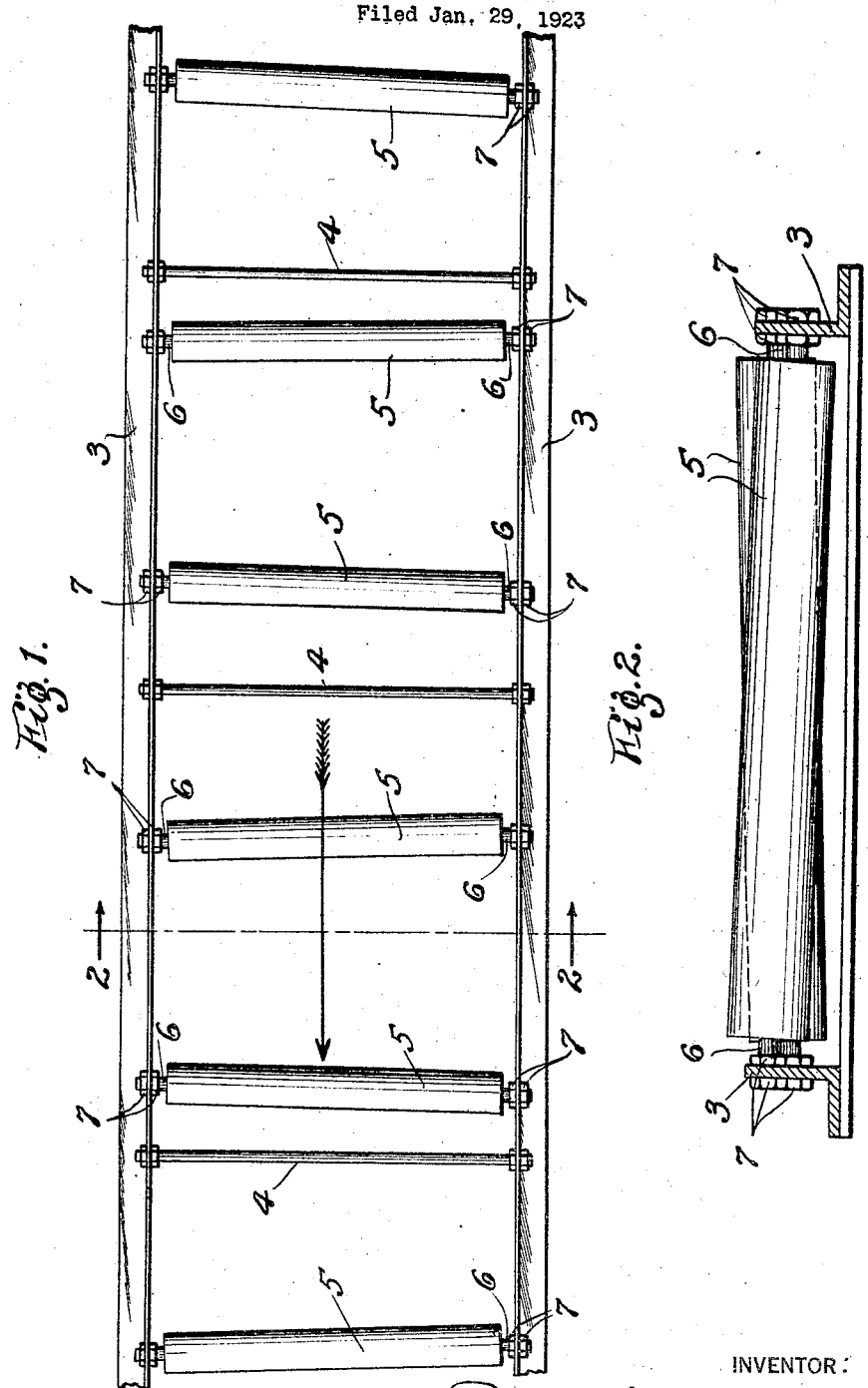

Patented Aug. 11, 1925.

1,548,926

UNITED STATES PATENT OFFICE.

JOHN A. ALVEY, OF ST. LOUIS, MISSOURI, ASSIGNOR TO ALVEY MANUFACTURING COMPANY, OF ST. LOUIS, MISSOURI, A CORPORATION OF MISSOURI.

CONVEYER.

Application filed January 29, 1923. Serial No. 615,477.

*To all whom it may concern:*

Be it known that I, JOHN A. ALVEY, a citizen of the United States, and a resident of the city of St. Louis and State of Missouri, have invented a new and useful Improvement in Conveyers, of which the following is a specification.

This invention relates to roller conveyers and has for its principal object to provide a simple and efficient arrangement of conveyer rollers for causing articles thereon to travel along the middle of the conveyerway.

The invention consists principally in a roller conveyer wherein the rollers are disposed at oblique angles with relation to both horizontal and vertical planes, the obliquity of alternate rollers being reversed. The invention also consists in the parts and in the combinations and arrangements of parts hereinafter described and claimed.

In the accompanying drawing wherein like symbols refer to like parts wherever they occur, Fig. 1 is a plan view of a roller conveyer embodying my invention, the direction of travel being indicated thereon by means of an arrow; and Fig. 2 is a vertical cross-section through said roller conveyer on line 2—2 in Fig. 1.

The roller conveyer shown in the accompanying drawing comprises a pair of spaced parallel side rails 3 preferably of angle-section and arranged with one flange vertical and with the other flange horizontal. The side rails are connected at suitable intervals by tie-rods 4 which serve to space them the desired distance apart.

The conveyer-way or bed comprises a series of spaced conveyer rollers 5 located between the side rails 3 of the conveyer. These rollers are rotatably supported at each end on bearing spindles 6 which extend through holes in the upstanding flanges of the side rails 3 and are held therein by suitable adjusting and lock nuts 7.

The bearing spindle 6 which supports one end of a roller is located at a higher elevation than the bearing spindle that supports the other end of said roller, whereby said roller is journaled on an axis that is disposed at an oblique angle with relation to the horizontal plane; that is, each roller is inclined downwardly from one side of the conveyer to the opposite side of the conveyer. This downward inclination of the rollers imparts a sidewise movement to the article traveling thereacross. Likewise, the bearing spindle that supports the high end of a roller is offset forwardly in the direction in which the articles travel with relation to the bearing spindle that supports the low end of said roller, whereby the axis of said roller is disposed at an oblique angle with relation to the vertical plane. This oblique angular position of the roller with respect to the vertical plane tends to impart a sidewise movement to the articles traveling thereacross.

For purposes of preventing the articles from riding off the sides of the conveyer, because of their oblique angular positions, alternate rollers are disposed in reverse oblique angular positions; that is, rollers whose axes are inclined downwardly and rearwardly from one side of the conveyer alternate with rollers whose axes are inclined downwardly and rearwardly from the opposite side of the conveyer. In other words, adjacent rollers are disposed at reverse oblique angles with relation to both horizontal and vertical planes.

This arrangement of rollers forms a troughlike bed or way of rollers and tends to make articles thereon travel along the midline thereof, thereby eliminating or minimizing the danger of said articles riding off the sides of said way. Other advantages of this arrangement of rollers are that it does not require the attention of an operator between the receiving and delivery ends of the conveyer, and that it does not require accurate positioning of the articles on the way, because of the tendency for the articles to adjust themselves along the midline of the conveyer before reaching the delivery end thereof.

The conveyer shown in the drawing is designed particularly for use as a lumber conveyer; but to adapt the conveyer for transporting smaller articles, it is only necessary to set the rollers closer together.

While the drawing illustrates the invention embodied in a conveyer wherein rollers of two types alternate, it is obvious that the alternation might be of a roller of one type with two or more rollers of another type.

What I claim is:

1. A gravity roller conveyer having a way comprising a single series of rotatably supported rollers, some of said rollers being disposed at oblique angles to said way in both horizontal and vertical planes, and other of said rollers being disposed at oblique angles to both horizontal and vertical planes that are the reverse of the obliquities of said first mentioned rollers.

2. A straightway gravity roller conveyer having an inclined way comprising a single series of rotatably supported rollers, the ends of some of the rollers being highest at one side of the conveyer and the ends of other of said rollers being highest at the other side of said conveyer, the high end of a roller being in advance of the low end thereof.

3. A gravity roller conveyer having an inclined way comprising rotatably supported rollers that extend the full width of said way and whose ends are highest at one side of the conveyer alternating with other rotatably supported rollers that extend the full width of the way and whose ends are highest at the other side of said conveyer, the high end of a roller being in advance of the low end thereof.

4. A roller conveyer comprising a single series of rotatably supported conveyer rollers that are disposed at oblique angles with relation to both horizontal and vertical planes, the obliquity of alternate rollers being reversed.

Signed at St. Louis, Missouri, this 26th day of January, 1923.

JOHN A. ALVEY.